United States Patent
Zhang et al.

(10) Patent No.: US 10,455,585 B2
(45) Date of Patent: Oct. 22, 2019

(54) METHOD AND APPARATUS FOR CARRIER AGGREGATION

(71) Applicant: HMD Global Oy, Espoo (FI)

(72) Inventors: Li Zhang, Beijing (CN); Hai Peng Lei, Beijing (CN); Chun Hai Yao, Beijing (CN)

(73) Assignee: HMD Global Oy, Espoo (FI)

( * ) Notice: Subject to any disclaimer, the term of this patent is extended or adjusted under 35 U.S.C. 154(b) by 0 days.

(21) Appl. No.: 16/037,063

(22) Filed: Jul. 17, 2018

(65) Prior Publication Data

US 2018/0324810 A1 Nov. 8, 2018

Related U.S. Application Data

(63) Continuation of application No. 14/419,301, filed as application No. PCT/CN2012/079685 on Aug. 3, 2012, now Pat. No. 10,051,633.

(51) Int. Cl.
*H04W 72/04* (2009.01)
*H04B 7/0456* (2017.01)
(Continued)

(52) U.S. Cl.
CPC ...... *H04W 72/0466* (2013.01); *H04B 7/0482* (2013.01); *H04B 7/0619* (2013.01);
(Continued)

(58) Field of Classification Search
CPC ....... H04B 7/0482; H04B 7/0619; H04L 5/14; H04L 1/1896; H04L 5/1469; H04L 5/001;
(Continued)

(56) References Cited

U.S. PATENT DOCUMENTS

2010/0103832 A1  4/2010  Zhou et al. .......... 370/252
2010/0189079 A1  7/2010  Eichinger et al. .......... 370/335
(Continued)

FOREIGN PATENT DOCUMENTS

CN  101873203 A  10/2010
CN  102104460 A  6/2011

OTHER PUBLICATIONS

3GPP TS 36.213 V 10.6.0, "3rd Generation Partnership Project; Technical Specification Group Radio Access Network; Evolved Universal Terrestrial Radio Access (E-UTRA); Physical layer procedures (Release 10)", Jun. 2012, 125 pgs.
(Continued)

*Primary Examiner* — Brian D Nguyen
(74) *Attorney, Agent, or Firm* — Harrington & Smith

(57) ABSTRACT

A method including: using first information and second information to determine a code book size, said first information including information for at least one first subframe of at least one cell for which feedback information is to be provided, said at least one first subframe is prior to subframe n and second information for at least one second subframe of at least one cell for which feedback information is to be provided, said at least one second subframe being after said subframe n; and using said code book size for providing feedback information.

27 Claims, 7 Drawing Sheets

(51) Int. Cl.
*H04B 7/06* (2006.01)
*H04L 1/18* (2006.01)
*H04L 5/14* (2006.01)
*H04L 5/00* (2006.01)

(52) U.S. Cl.
CPC .............. *H04L 1/1896* (2013.01); *H04L 5/14* (2013.01); *H04W 72/042* (2013.01); *H04W 72/0413* (2013.01); *H04L 5/001* (2013.01); *H04L 5/1469* (2013.01)

(58) Field of Classification Search
CPC ......... H04W 72/0413; H04W 72/0466; H04W 72/042
See application file for complete search history.

(56) References Cited

U.S. PATENT DOCUMENTS

| | | | | |
|---|---|---|---|---|
| 2011/0149807 | A1* | 6/2011 | Yin | H04L 1/0029 370/256 |
| 2012/0051257 | A1* | 3/2012 | Kim | H04B 7/024 370/252 |
| 2012/0087254 | A1 | 4/2012 | Yin | 370/252 |
| 2012/0140708 | A1* | 6/2012 | Choudhury | H04W 72/082 370/328 |
| 2012/0188925 | A1 | 7/2012 | Li | 370/311 |
| 2012/0218948 | A1* | 8/2012 | Onggosanusi | H04L 1/0031 370/329 |
| 2012/0220286 | A1* | 8/2012 | Chen | H04W 24/10 455/422.1 |
| 2012/0269103 | A1 | 10/2012 | Papasakellariou | 370/280 |
| 2012/0287869 | A1* | 11/2012 | Xi | H04L 5/003 370/329 |
| 2013/0064209 | A1* | 3/2013 | Tiirola | H04L 1/1692 370/329 |
| 2013/0301433 | A1 | 11/2013 | Yin | 370/252 |
| 2014/0010128 | A1 | 1/2014 | He | 370/280 |

OTHER PUBLICATIONS

R1-112010, Huawei, et al., "Determination of PUSCH A/N codebook size for TDD", 3GPP TSG RAN WG1 Meeting #65, Barcelona, Spain, May 9-13, 2011.
R1-122031, CATT; "HARQ-ACT feedback for TDD inter-band CA", 3GPP TSG RAN WG1 Meeting #69; Prague, Czech Republic, May 21-25, 2012.

* cited by examiner

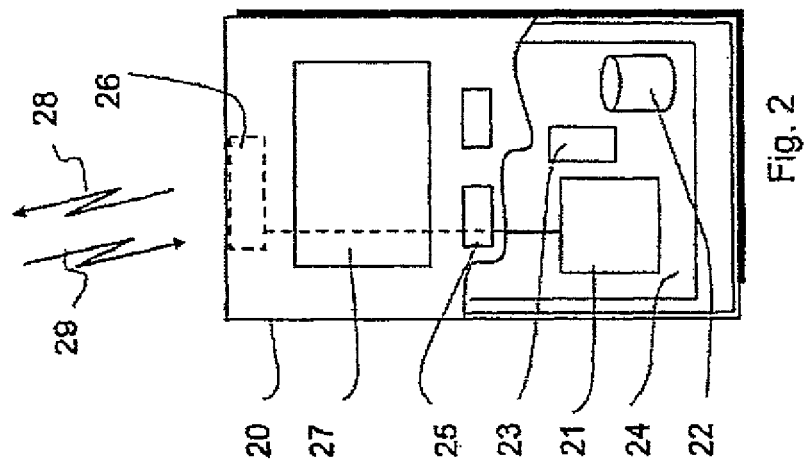
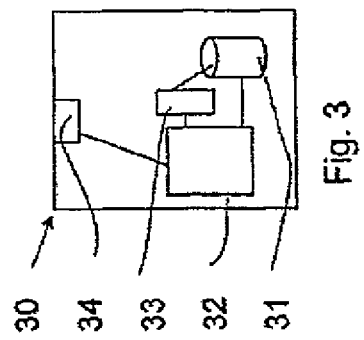
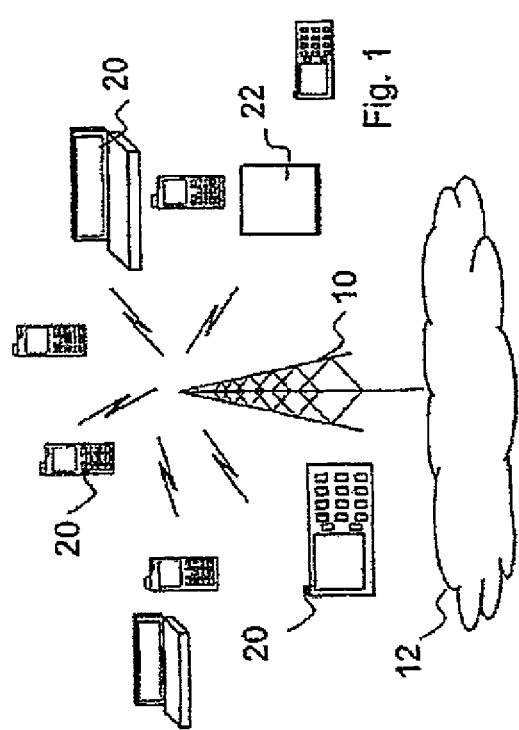

Figure 4

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | - | - | - | 6 | - | - |
| 1 | - | - | 7,6 | 4 | - | - | - | 7,6 | 4 | - |
| 2 | - | - | 8,7,4,6 | - | - | - | - | 8,7,4,6 | - | - |
| 3 | - | - | 7,6,11 | 6,5 | 5,4 | - | - | - | - | - |
| 4 | - | - | 12,8,7,11 | 6,5,4,7 | - | - | - | - | - | - |
| 5 | - | - | 13,12,9,8,7,5,4,11,6 | - | - | - | - | - | - | - |
| 6 | - | - | 7 | 7 | 5 | - | - | 7 | 7 | - |

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | 4 | | | 4 | | | | | 4 | 4 |
| 3 | | | | | | | | | 4 | 4 |
| 4 | | | | | | | | | 4 | 4 |
| 5 | | | | | | | | | 4 | |
| 6 | 7 | 7 | | | | 7 | 7 | | | 5 |

METHOD AND APPARATUS FOR CARRIER AGGREGATION

The present application is a continuation of U.S. patent Ser. No. 14/419,301, filed on Feb. 3, 2015, which is a National Stage application under 35 U.S.C. § 371 of PCT/CN2012/079685, filed on Aug. 3, 2012, the disclosures of which are hereby incorporated by reference in their entirety.

This disclosure relates to a method and apparatus and in particular but not exclusively to methods and apparatus for use with time division duplexing carrier aggregation.

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shah be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

Some systems use FDD (frequency division duplexing) and other systems use TDD (time division duplexing). With FDD, different frequencies are used for UL and DL communications with a UE. With TDD, the same frequency is used for UL and DL communications but different time slots are allocated for UL and DL communication.

Carrier aggregation has been proposed and this allows the bandwidth associated with a UE to be expanded by concurrently using radio resources across two or more carriers. The component carriers are aggregated to form a larger overall transmission bandwidth Control information may be communicated for example on a physical uplink control channel (PUCCH). For example, signaling for the purposes of error detection and/or correction may be provided by means of such signaling. Requests for retransmission of any information that the recipient node did not successfully receive are possible. For example, hybrid automatic repeat request (HARQ) error control mechanism may be used for this purpose. The error control mechanism can be implemented such that a transmitting device shall receive either a positive or a negative acknowledgement (ACK/NACK; A/N) or other indication regarding its transmission from a receiving device.

UL control information may be communicated on a physical uplink shared channel (PUSCH) if the PUSCH is scheduled for UL data transmission.

HARQ can be used in the context of carrier aggregation (CA). As mentioned previously, in carrier aggregation more than one carrier can be used for communications between two devices. HARQ feedback for one carrier may be transmitted on the Physical Uplink Control Channel (PUCCH) of another carrier.

Inter band TDD (time division duplex) CA with different UL DL configurations on the different bands has been proposed. This may cause complexities with respect to HARQ feedback because HARQ timing in TDD is coupled to the UL/DL configuration.

In a first aspect there is provided a method comprising: using first information and second information to determine a code book size, said first information comprising information for at least one first subframe of at least one cell for which feedback information s to be provided, said at least one first subframe is no later than subframe n and second information for at least one second subframe of at least one call for which feedback information is to be provided, said at least one second subframe being after said subframe n; and using said code book size for providing feedback information.

Preferably the method comprises receiving said first information and said second information from a base station.

Alternatively the method comprises receiving said first information from a base station and calculating said second information.

Preferably the method comprises receiving said information from said base station in a downlink assignment index contained in uplink grant.

Preferably the method comprises causing said feedback information to be transmitted on a physical uplink shared channel scheduled in subframe n.

Preferably the method comprises causing feedback information to be transmitted in a subframe which is k subframes later than subframe n.

Preferably said feedback information comprises feedback information for said at least one first subframe and said at least one second subframe, if said at least one second subframe is scheduled.

Preferably said at least one second subframe is not scheduled, then a discontinuous transmission is provided for said at least one subframe as said feedback information.

Preferably said feedback information comprises hybrid automatic repeat request information.

Preferably said first and second information comprises information from a plurality of different cells.

Preferably said plurality of different cells use different uplink downlink time division duplex configurations.

In a second aspect there is provided a method comprising: causing first information and second information to be provided to a user equipment, said first and second information for determining a code book size, said first information comprising information for at least one first subframe of at least one cell for which feedback information is to be provided, said at least one first subframe is no later than subframe n and second information for at least one second subframe of at least one cell for which feedback information is to be provided, said at least one second subframe being after said subframe n.

In a third aspect there is provided a computer program comprising computer executable instructions which when run are configured to provide the method as set forth above.

In a fourth aspect there is provided an apparatus comprising at least one processor and at least one memory including computer code for one or more programs, the at least one memory and the computer code configured, with the at least one processor, to cause the apparatus at least to: use first information and second information to determine a code book size, said first information comprising information for at least one first subframe of at least one cell for which feedback information is to be provided, said at least one first subframe is no later than subframe n and second information for at least one second subframe of at least one cell for which feedback information is to be provided, said at least one second subframe being after said subframe n; and use said code book size for providing feedback information.

Preferably the at least one memory and the computer code are configured with the at least one processor to cause the apparatus to receive said first information and said second information from a base station.

Alternatively the at least one memory and the computer code are configured with the at least one processor to cause the apparatus to receive said first information from a base station and calculate said second information.

Preferably the at least one memory and the computer code are configured with the at least one processor to cause the apparatus to receive said information from said base station in an uplink downlink assignment index.

Preferably the at least one memory and the computer code are configured with the at least one processor to cause the apparatus to cause said feedback information to be transmitted on a physical uplink shared channel scheduled in subframe n.

Preferably the at least one memory and the computer code are configured with the at least one processor to cause the apparatus to cause feedback information to be transmitted in a subframe which is k subframes later than subframe n.

Preferably said feedback information comprises feedback information for said at least one first subframe and said at least one second subframe, if said at least one second subframe is scheduled.

Preferably the at least one memory and the computer code are configured with the at least one processor to cause the apparatus to, if said at least one second subframe is not scheduled, to provide a discontinuous transmission for said at least one subframe as said feedback information.

Preferably said feedback information comprises hybrid automatic repeat request information.

Preferably said first and second information comprises information from a plurality of different cells.

Preferably said plurality of different cells use different uplink downlink time division duplex configurations.

In a fifth aspect there is provided a user equipment comprising an apparatus as set forth above.

In a sixth aspect there is provided an apparatus comprising at least one processor and at least one memory including computer code for one or more programs, the at least one memory and the computer code configured, with the at least one processor, to cause the apparatus at least to: cause first information and second information to be provided to a user equipment, said first and second information for determining a code book size, said first information comprising information for at least one first subframe of at least one cell for which feedback information is to be provided, said at least one first subframe is no later than subframe n and second information for at least one second subframe of at least one cell for which feedback information is to be provided, said at least one second subframe being after said subframe n.

In a seventh aspect there is provided a base station comprising an apparatus as set forth above.

In an eighth aspect there is provided a method comprising: causing first information to be provided to a user equipment, said first information for determining a code book size, said first information comprising information for at least one first subframe of at least one call for which feedback information is to be provided, said at least one first subframe is no later than subframe n and second information for at least one second subframe of at least one cell for which feedback information s to be provided, said at least one second subframe being after said subframe n.

In a ninth aspect there is provided an apparatus comprising at least one processor and at least one memory including computer code for one or more programs, the at least one memory and the computer code configured, with the at least one processor, to cause the apparatus at least to: cause first information to be provided to a user equipment, said first information for determining a code book size, said first information comprising information for at least one first subframe of at least one cell for which feedback information s to be provided, said at least one first subframe is no later than subframe n and second information for at least one second subframe of at least one cell for which feedback information is to be provided, said at least one second subframe being after said subframe n.

In a tenth aspect there is provided an apparatus comprising means for using first information and second information to determine a code book size, said first information comprising information for at least one first subframe of at least one cell for which feedback information is to be provided, said at least one first subframe is no later than subframe n and second information for at least one second subframe of at least one cell for which feedback information is to be provided, said at least one second subframe being after said subframe n; and means for using said code book size for providing feedback information.

Preferably the apparatus comprises means for receiving said first information and said second information from a base station.

Alternatively the apparatus comprising means for receiving said first information from a base station and means for calculating said second information.

Preferably the apparatus is configured to receive said information from said base station in an uplink downlink assignment index.

Preferably the apparatus is configured to cause said feedback information to be transmitted on a physical uplink shared channel scheduled in subframe n.

Preferably the apparatus is configured to cause feedback information to be transmitted in a subframe which is k subframes later than subframe n.

Preferably said feedback information comprises feedback information for said at least one first subframe and said at least one second subframe, if said at least one second subframe is scheduled.

Preferably the apparatus comprises means for, if said at least one second subframe is not scheduled, providing a discontinuous transmission for said at least one subframe as said feedback information.

Preferably said feedback information comprises hybrid automatic repeat request information.

Preferably said first and second information comprises information from a plurality of different cells.

Preferably said plurality of different cells use different uplink downlink time division duplex configurations.

In an eleventh aspect there is provided a user equipment comprising an apparatus as set forth above.

In a twelfth aspect there is provided an apparatus comprising means for causing first information and second information to be provided to a user equipment, said first and second information for determining a code book size, said first information comprising information for at least one first subframe of at least one cell for which feedback information is to be provided, said at least one first subframe is no later than subframe n and second information for at least one second subframe of at least one cell for which feedback information is to be provided, said at least one second subframe being after said subframe n.

In a thirteenth aspect there is provided a base station comprising an apparatus as set forth above.

In a fourteenth aspect there is provided an apparatus comprising means for causing first information to be provided to a user equipment, said first information for determining a code book size, said first information comprising information for at least one first subframe of at least one cell for which feedback information is to be provided, said at least one first subframe is no later than subframe n and second information for at least one second subframe of at least one cell for which feedback information is to be provided, said at least one second subframe being after said subframe n.

A node such as a base station or a communication device of a user of machine type terminal can be configured to operate in accordance with the various embodiments.

A computer program comprising program code means adapted to perform the method may also be provided. The computer program may be stored and/or otherwise embodied by means of a carrier medium.

It should be appreciated that any feature of any aspect may be combined with any other feature of any other aspect.

Embodiments will now be described in further detail, by way of example only, with reference to the following examples and accompanying drawings, in which:

FIG. 1 shows a schematic diagram of a communication system comprising a base station and a plurality of communication devices;

FIG. 2 shows a schematic diagram of a mobile communication device according to some embodiments;

FIG. 3 shows a schematic diagram of a control apparatus according to some embodiments;

FIG. 4 shows a table of uplink and downlink configuration options for LTE TDD;

FIG. 5 shows a table for the report of HARQ feedback for each of the configuration options of FIG. 4;

FIG. 8 shows a table with "k" values for the TDD configurations of FIG. 4; and

Figure 6:
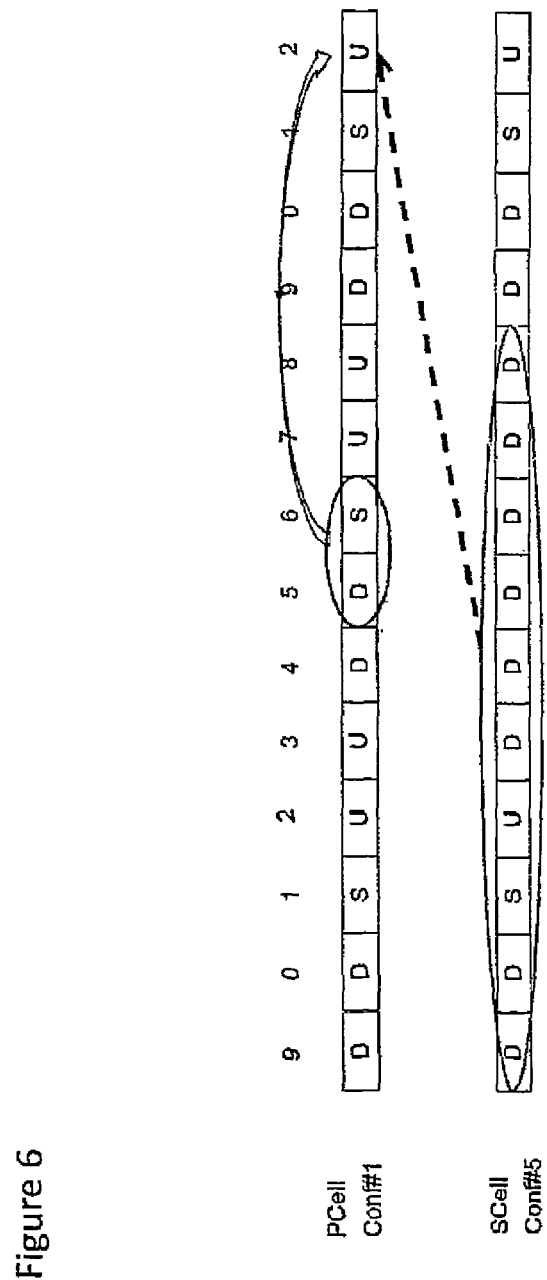
FIG. 6 shows a first problem with configurations 1 and 5 when used in CA.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

A device capable of wireless communications can communicate via at least one base station or similar wireless transmitter and/or receiver node. In FIG. 1 a base station 10 is shown to be serving various mobile devices 20 and a machine-like terminal 22. Base stations are typically controlled by at least one appropriate controller apparatus so as to enable operation thereof and management of mobile communication devices in communication with the base stations. The base station can be connected further to a broader communications system 12. It shall be understood that a number of neighbouring and/or overlapping access systems or radio service areas provided by a number of base stations may exist. A base station site can provide one or more cells or sectors, each sector providing a cell or a subarea of a cell. Each device and base station may have one or more radio channels open at the same time and may send signals to and/or receive signals from one or more sources. As a plurality of devices can use the same wireless resource, transmissions thereof need to be scheduled to avoid collisions and/or interference.

A possible mobile communication device for transmitting in uplink and receiving in downlink will now be described in more detail with reference to FIG. 2 showing a schematic, partially sectioned view of a communication device 20. Such a communication device is often referred to as user equipment (UE) or terminal. An appropriate communication device may be provided by any device capable of sending radio signals to and/or receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Non-limiting examples of content data include downloads, television and radio programs, videos, advertisements, various alerts and other information.

The device 20 is configured to receive signals in the downlink 29 over an air interface via appropriate apparatus for receiving and to transmit signals in the uplink 28 via appropriate apparatus for transmitting radio signals. In FIG. 2 the transceiver apparatus is designated schematically by block 26. The transceiver apparatus 26 may be provided for example by means of a radio part and associated antenna arrangement. The antenna arrangement may be arranged internally or externally to the mobile device.

A mobile communication device is also provided with at least one data processing entity 21, at least one memory 22 and other possible components 23 for use in software and hardware aided execution of tasks it is designed to perform, including control of access to and communications with base stations and/or other communication devices. The data processing storage and other relevant apparatus can be provided on an appropriate circuit board and/or in chipsets. This apparatus is denoted by reference 24.

The user may control the operation of the mobile device by means of a suitable user interface such as key pad 25, voice commands, touch sensitive screen or pad, combinations thereof or the like. A display 27, a speaker and a microphone can be also provided. Furthermore, a communication device may comprise appropriate connectors (either wired or wireless) to other devices and/or for connecting external accessories, for example hands-free equipment, thereto.

FIG. 3 shows an example of a control apparatus 30 for a communication system, for example to be coupled to and/or for controlling a base station. In some embodiments a base station may comprise an integrated control apparatus and some other embodiments the control apparatus can be provided by a separate network element. The control apparatus can be interconnected with other control entitles. The control apparatus and functions may be distributed between a plurality of control units. In some embodiments each base station can comprise a control apparatus. In alternative embodiments, two or more base stations may share a control apparatus. The arrangement of the control depends on the standard, and for example in accordance with the current LTE specifications no separate radio network controller is provided. Regardless of the location, the control apparatus 30 can be understood as providing control on communications in the service area of at least one base station. The control apparatus 30 can be configured to provide control functions in accordance with embodiments described below. For this purpose the control apparatus can comprise at least one memory 31, at least one data processing unit 32, 33 and an input/output interface 34. Via the interface the control apparatus can be coupled to a base station or other parts of the base station to cause operation of the base station in accordance with the below described embodiments. The control apparatus can be configured to execute an appropriate software code to provide the control functions.

A wireless communication device, such as a mobile device, machine-like terminal or a base station, can be provided with a Multiple Input/Multiple Output (MIMO) antenna system. MIMO arrangements as such are known. MIMO systems use multiple antennas at the transmitter and receiver along with advanced digital signal processing to improve link quality and capacity. For example, the transceiver apparatus 26 of FIG. 2 can provide a plurality of antenna ports. More data can be received and/or sent where there are more antennae elements.

Some embodiments may be used in relation to 3GPP LTE-Advanced technology Rel-11. It should of course be appreciated that some embodiments may be used with later releases or in relation to different standards. Some embodiments may be used with the LTE TDD carrier aggregation (CA) enhancement of different TDD UL/DL configurations on different bands.

Inter-band TDD CA (carrier aggregation) with different UL/DL configurations on different bands has been proposed. Some embodiments relates to HARQ-ACK feedback on the PUCCH and/or PUSCH.

With inter-band TDD CA, different UL/DL configurations may be used on different carriers (cells). Inter band carrier aggregation of TDD component carriers with different uplink/down link configurations may give rise to certain advantages. For example, these advantages may include one or more of the following: coexistence with the neighbouring legacy TDD systems; supporting aggregation of traffic dependent carriers in heterogeneous networks; flexible configuration, for example more uplink subframes in the lower frequency bands for better coverage and/or more downlink subframes in high frequency bands for traffic transmission; and/or obtain a higher peak data rate.

LTE TDD allows for asymmetric uplink/downlink allocation by providing seven different TDD uplink/down link configurations. This is shown in table of FIG. 4. These configurations may provide for example between 40 to 909 down link frames. There are configurations 0-6. Each configuration specifies which of ten subframes 0-9 are uplink subframes and which are downlink subframes. In some embodiments, subframes 0 and 5 contain a synchronization signal and broadcast information which allows the UE to perform synchronization and obtain relevant system information. These subframes are downlink subframes. Subframe 1 is a subframe which serves as a switching point between downlink to uplink transmissions. This has a downlink pilot time slot and an uplink pilot time slot separated by a guard period. Depending on the switching point periodicity, in some UL/DL configurations subframe 6 may also serve as a switching point. In configuration number 0 (#0), subframes 2, 3, 4, 7, 8 and 9 are uplink subframes.

LTE TDD may be operated as a DL heavy system, which results in a UL subframe often used to transmit HARQ-ACKs corresponding to multiple DL subframes. As for example specified in TS 36.213, the set of DL subframes whose HARQ-ACKs are reported in the same UL subframe is listed in the Table of FIG. 5. The table of FIG. 5 shows which uplink subframes handling ACK/NACK feedback for certain downlink subframe(s) for each of the different UL/DL configurations of FIG. 4. For example, in UL/DL configuration #4, uplink subframe #2 handles feedback for downlink subframes which are 12, 8, 7, and 11 subframes earlier than uplink subframe 2, i.e. downlink subframes 0, 4, 5, and 1. Depending on the uplink-downlink configuration one uplink subframe may be responsible for ACK/NACK feedback for one or multiple downlink subframes. This means that HARQ feedback on different carriers may follow different timings.

It has been agreed that HARQ-ACK timing of PCell (primary cell) PDSCH (physical downlink shared channel), the scheduling timing of PCell PUSCH, and the HARQ timing of PCell PUSCH should follow the PCell timing. The PCell timing may be as in Rel-8/9/10.

It has been agreed that the PDSCH HARQ timing on SCell (secondary cell) shall follow the PCell SIB1 (System Information Block) configuration if the set of DL subframes indicated by the SCell SIB1 configuration is a subset of the DL subframes indicated by the PCell SIB1 configuration.

For the case where the set of DL subframes indicated by the SCell SIB1 configuration is not a subset of the DL subframes indicated by the PCell SIB1 configuration the following has been decided for a self-scheduling situation (Self-scheduling means that the grant for PDSCH/PUSCH on cell c is transmitted on cell c)).

On PDSCH timing for the case where the SCell(s) downlink subframes is a superset of PCell, for a full-duplex case, agreement is that SCell PDSCH HARQ timing should follow the SCell SIB1 HARQ timing. For a half-duplex case, the assumption is to follow SCell SIB1 HARQ timing On PDSCH timing for the case where the set of SCell(s) downlink subframes is neither a subset nor a superset of PCell, in the case of self-scheduling, a reference configuration is used where the timing follows a third UL/DL configuration (different than PCell and SCell SIB1 UL/DL configuration).

Based on the above, PDSCH HARQ timing for PCell PDSCH follows PCell UL/DL configuration itself, while PDSCH HARQ timing reference for a SCell in case of self-scheduling and full duplex follows the HARQ timing reference for a SCell.

The HARQ timing reference for a SCell can be different from PCell TDD UL/DL configuration. As a result, the inventors have appreciated that the HARQ-ACK transmission methods defined in Rel-10 assuming PCell timing for all configured carriers are problematic.

As shown in FIG. 6, two carriers on different bands with different TDD UL/DL configurations are aggregated. PCell Is configured with TDD UL/DL configuration number 1 and SCell with TDD UL/DL configuration number 5. Therefore, the set of DL subframes on SCell is a superset of the DL subframes on PCell. PDSCH HARQ timing for PCell PDSCH shall follow TDD UL/DL configuration 1, while PDSCH HARQ timing reference for the SCell in case of self-scheduling shall follow TDD UL/DL configuration 5.

Therefore, according to the ACK/NACK transmission timing specified in the table of FIG. 5, ACK/NACK corresponding to DL subframe 5 and 6 in the PCell should be transmitted in UL subframe 2 in the PCell to follow the HARQ timing of TDD UL/DL configuration 1. Meanwhile, ACK/NACK corresponding to DL subframe 9 (in previous frame) and DL subframes in the subframes 0 to 8 (in current frame) in the SCell shall be transmitted in UL subframe 2 (in next frame) in the PCell to follow the HARQ timing of TDD UL/DL configuration 5. When these ACK/NACK bits are transmitted by PUSCH in UL subframe Z in PCell and this PUSCH is adjusted based on a detected PDCCH with DCI (downlink control information) format 0/4, this DCI format 0/4 should be sent in DL subframe 6 in the PCell following PCell PUSCH transmission timing in FIG. 8. In this way, eNB does not know whether SCell DL subframe 7 and 8 will be scheduled or not due to UL grant timing in PCell is prior to these two subframes possibly being scheduled in the SCell in the time domain. If the eNB still sends the DAI (downlink assignment index) in DCI format 0/4 according to the maximum scheduled DL subframes across the two carriers without the consideration of DL subframe 7 and 8 possibly being scheduled in the SCell, UE shall get a wrong UL DAI in case of DL subframe 7 and 8 in SCell are scheduled. Since UL DAI is used to determine the codebook size of HARQ-ACK transmission it will lead to difficulties with the ACK/NACK feedback between eNB and UE.

The UL DAI indicates the number of bits the UE is required to feedback. The DL DAI indicates to the UE the number of subframes scheduled up to the detected DL grant.

Figure 7:
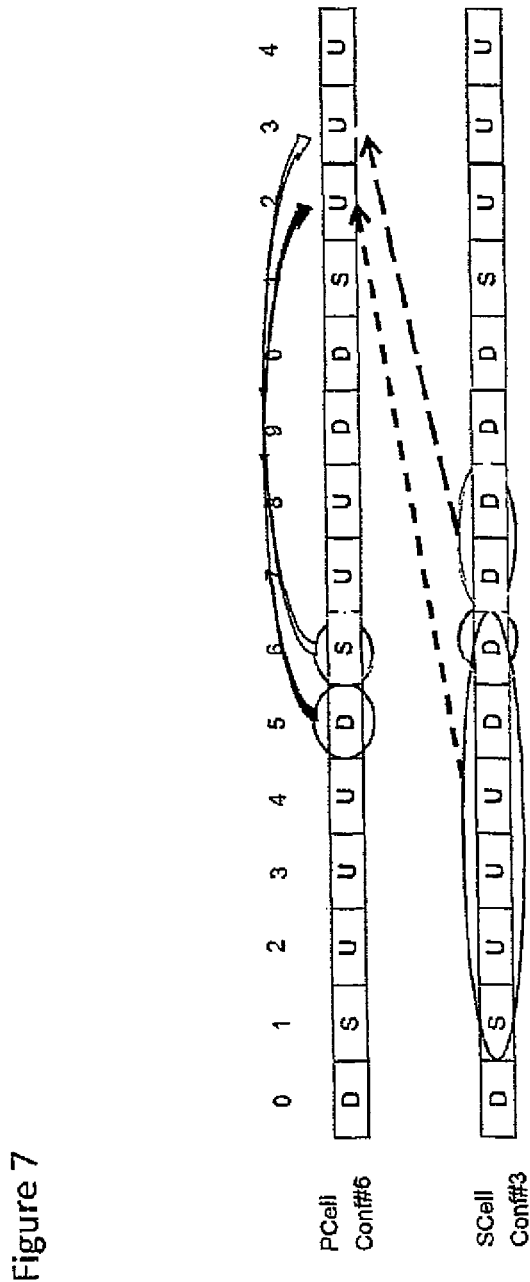
FIG. 7 shows a second problem with configurations 6 and 3 when used in CA.

A similar case is shown n FIG. 7 when the PCell is configured with TDD UL/DL configuration #6 and SCell with TDD UL/DL configuration #3 as shown in FIG. 3. In this case, the set of DL subframes on SCell Is also a superset of the DL subframes on the PCell. The PDSCH HARQ timing for PCell PDSCH shall follow TDD UL/DL configuration 6, while the PDSCH HARQ timing reference for the SCell in case of self-scheduling shall follow TDD UL/DL configuration 3.

Therefore, according to the ACK/NACK transmission timing specified in the table of FIG. 5, an ACK/NACK corresponding to DL subframe 5 and 6 in PCell shall be transmitted in UL subframe 2 and 3 respectively in the PCell to follow the HARQ timing of TDD UL/DL configuration 6. Meanwhile, the ACK/NACK corresponding to DL subframe 1, 5 and 6 In the SCell shall be transmitted in UL subframe 2 In the PCell, and the ACK/NACK corresponding to DL subframe 7 and 8 in SCell shall be transmitted in UL subframe 3 in PCell to follow the HARQ timing of TDD UL/DL configuration 3. When these ACK/NACK bits are transmitted by the PUSCH and the PUSCH is adjusted based on a detected PDCCH with DCI format 0/4, this DCI format 0/4 should be sent in DL subframe 5 and 6 In the PCell following the PCell PUSCH transmission timing, respectively. In this way, in DL subframe 5, the eNB does not know whether the SCell DL subframe 6 will be scheduled or not due to UL grant timing in the PCell prior to one subframe possibly being scheduled in the SCell in the time domain. In DL subframe 6, a eNB does not know whether the SCell DL subframe 7 and 8 will be scheduled or not due to UL grant timing in the PCell prior to these two subframes possibly being scheduled in the SCell in the time domain. This may lead to difficulties with ACK/NACK codebook size between eNB and UE.

It is noted that in FIG. 7 the number of possibly scheduled DL subframes in SCell later than the UL grant in PCell is different in different sets of DL subframes whose HARQ-ACKs are reported in the same UL subframe.

Based on the above, different PDSCH HARQ reference timings may be used for inter-band TDD CA with different TDD UL/DL configurations. The results in different bundle window sizes. The bundle window size is the number of elements in the set Kc. For example, for configuration 0 one UL subframe is used for HARQ feedback for only 1 DL subframe, M=1 or only 1 element in the set Kc. For other configurations, such as configuration 2, UL subframe#2 is used for HARQ feedback for 4 DL subframes, in this case M=4 or 4 elements in the set Kc. The different bundle window sizes may lead to the problems with the UL DAI when the HARQ-ACK is transmitted on the PUSCH adjusted by DCI format 0/4. Since the codebook size is determined by UL DAI, this issue may cause a misunderstanding on the ACK/NACK transmission between eNB and UE. The DL performance may be degraded. Some embodiments address this UL DAI.

Currently for TDD, upon detection of a PDSCH transmission or a PDCCH indicating downlink SPS (semi persistent scheduling) release within subframe(s) n−k, where k∈K and K is defined in the table of FIG. 5 intended for the UE and for which ACK/NACK response shall be provided, the UE will transmit the ACK/NACK response in UL subframe n.

For TDD UL/DL configurations 1-6 and normal HARQ operation, the UE will, upon detection of a PDCCH with uplink DCI format and/or a PHICH (Physical hybrid ARQ indicator channel) transmission in a subframe n intended for the UE, adjust the corresponding PUSCH transmission in subframe n+k, with k given in the table of FIG. 8, according to the PDCCH and PHICH information.

In LTE Rel-10 CA, all configured component carriers are configured with same TDD UL/DL configurations. So the bundle window sizes in PCell and SCell are always same.

The inventors have appreciated that the proposals in LTE Rel-11 inter-band TDD CA, different PDSCH HARQ reference timing used with different TDD UL/DL configurations and that this causes different bundle window sizes. This leads to difficulties with the UL DAI indication.

In some embodiments, an UL DAI indication/ACK/NACK codebook size determination scheme is provided for an inter-band TDD CA UE configured with different TDD UL/DL configurations on different bands.

In some embodiments two types of DL subframes can be defined:

DL subframes on all serving cells no later than the DL subframe n and the corresponding ACK/NACK transmitted on the PUSCH scheduled in DL subframe n are referred to as type 1;

DL subframes on all serving cells later than the DL subframe n and the corresponding ACK/NACK transmitted on PUSCH scheduled in DL subframe n are referred to as type 2.

ACK/NACK corresponding to both types of DL subframes are reported in the same UL subframe n+k, where k is given in the table of FIG. 8, according to the PDCCH information.

In a first embodiment, the UE generates ACK/NACK codebook on PUSCH according to UL DAI, but the value of UL DAI calculated at the eNB side should be the maximum number of actually scheduled type 1 DL subframes plus a maximum number of type 2 DL subframes. A new definition of the UL DAI may be specified so that the UE does not interpret the UL DAI by e.g. take non-scheduling as DL grant missing, or determine a wrong codebook size.

In a second embodiment, the UE generates a ACK/NACK codebook on the PUSCH according to UL DAI and the maximum number of type 2 DL subframes, and the value of the UL DAI calculated at the eNB side should be the maximum number of actually scheduled type 1 DL subframes. The requires the specifying of new codebook generation at UE side.

For either or both of these embodiments, if the UE does not detect any DL PDSCH transmission or PDCCH indicating DLSPS release in a type 2 DL subframe, the LIE shall feedback DTX (discontinuous transmission) as HARQ-ACK transmission corresponding to that subframe.

Hence, the corresponding ACK/NACK feedback can be transmitted on PUSCH after detected DCI format 0/4. Any misunderstanding on the codebook size determination between eNB and UE can be avoided.

These embodiments will now be described in more detail.

To summarize, in LTE Rel-11 inter-band TDD CA with different TDD UL/DL configurations on different bands, because different PDSCH HARQ reference timing may be used for different carriers, the bundle window size of PCell and SCell may be different, which will lead to the difficulties in relation to the UL DAI when the HARQ-ACK is transmitted on PUSCH adjusted by DCI format 0/4.

Figure 9:
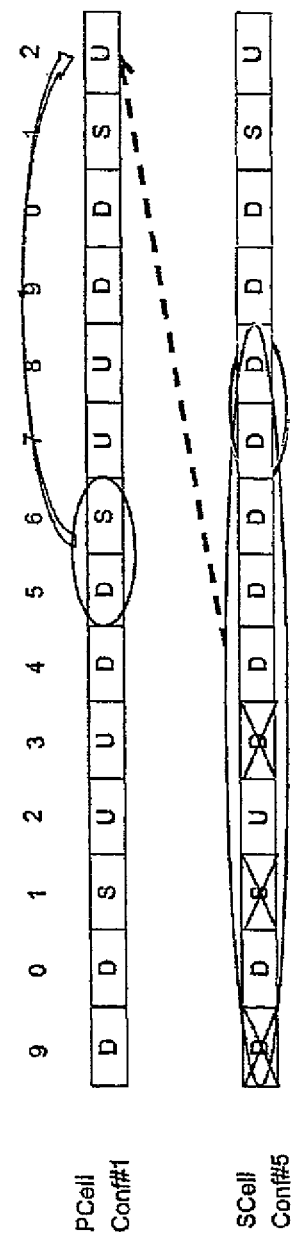
FIG. 9 shows how embodiments address the problem with configurations 1 and 5 shown in FIG. 6.

Reference is made to FIG. 9 which shows how some embodiments may address the problem set out in relation to FIG. 6.

The DL subframe 5 and 6 In the PCell and the DL subframe 9 (In the previous frame) and the DL subframes 0 to 6 (in current frame) in the SCell are type 1 DL subframes, and the DL subframe 7 and 8 in the SCell are type 2 DL subframes, corresponding to the PUSCH on the PCell scheduled in the DL subframe 6 in the PCell.

Assume the DL subframe 5 and 6 in PCell together with DL subframe 0, 4, 5 and 6 In SCell are scheduled. According to the HARQ transmission timing specified in the table of FIG. 5, ACK/NACK corresponding to these DL subframes in the PCell and the SCell shall be transmitted in UL subframe 2 In the PCell to follow the respective HARQ timing of TDD UL/DL configuration 1 and 5. When these ACK/NACK bits are transmitted by PUSCH in UL subframe 2 in PCell and this PUSCH is adjusted based on a detected PDCCH with DCI format 0/4, this DCI format 0/4 should be sent in DL subframe 6 in the PCell following PCell PUSCH transmission timing.

Hence, up to Subframe 6, the current maximum scheduled DL subframes across PCell and SCell are 4 without the consideration of SCell DL subframe 7 and 8. So $W_{DAI}^{UL}=4$. With current specification, if eNB sends this DAI value in DCI format 0/4, the UE would get a wrong UL DAI in case of either DL subframe 7 or 8 or both are scheduled in the SCell, which will lead to misunderstanding on ACK/NACK codebook size between eNB and UE.

In the first embodiment, the DAI in DCI format 0/4 in PCell is determined by the current maximum practically scheduled DL subframes plus the number of possibly to be scheduled DL subframes in SCell later than the subframe for the sending DCI format 0/4 whose HARQ-ACKs are reported in the same UL subframe. In FIG. 9, this new DAI is 4+2=6. So $W_{DAI}^{UL}=2$ is sent in DCI format 0/4 from the base station according to the equation of $B_c^{DL}=W_{DAI}^{UL}+4\lceil (U-W_{DAI}^{UL})/4\rceil$.

At UE side, upon detection of this DAI in DCI format 0/4, UE shall know the codebook size determination, $O_c^{ACK}$ for the c-th serving cell, where $c\geq 0$, $O_c^{ACK}=B_c^{DL}$ if the transmission mode configured in the c-th serving cell supports one transport block or spatial HARQ-ACK bundling is applied and $O_c^{ACK}=2B_c^{DL}$ otherwise, where $B_c^{DL}$ is the number of downlink subframes for which the UE needs to feedback HARQ-ACK bits for the c-th serving cell. In detail, for PCell configured with TDD UL/DL configuration 1, the UE shall assume $B_c^{DL}=\min(W_{DAI}^{UL},M_c)=2$ for PCell and generate two ACK/NACK bits corresponding to DL subframe 5 and 6, $o_{c,0}^{ACK} o_{c,1}^{ACK}$; for SCell configured with TDD UL/DL configurations 5, the UE shall $B_c^{DL}=W_{DAI}^{UL}+4\lceil(U-W_{DAI}^{UL})/4\rceil=6$ and generate 6 ACK/NACK bits corresponding to DL subframe 0, 4, 5, 6, 7 and 8, $o_{c,0}^{ACK} o_{c,1}^{ACK}, \ldots, o_{c,5}^{ACK}$ where U denotes the maximum total number of received PDSCHs and PDCCH indicating downlink SPS release in subframe(s) n-k on the SCell, $k\in K$. If UE does not detect any DL PDSCH transmission or PDCCH indicating DL SPS release in the SCell DL subframe 7 or 8, UE shall feedback DTX as HARQ-ACK transmission corresponding to that subframe. Thus in some embodiments there is no misunderstanding between eNB and UE on ACK/NACK codebook size determination.

With the second embodiment, the DAI in DCI format 0/4 in the PCell may be determined by the current maximum practically scheduled DL subframes. In FIG. 9, this new DAI is 4. So $W_{DAI}^{UL}=4$ is sent in DCI format 0/4 according to the equation of $B_c^{DL}=W_{DAI}^{UL}+4\lceil(U-W_{DAI}^{UL})/4\rceil$.

At UE side, upon detection of this DAI in DCI format 0/4, UE shall know the codebook size determination, $O_c^{ACK}$ for the c-th serving cell, where $c\geq 0$, $O_c^{ACK}=B_c^{DL}$ If transmission mode configured in the c-th serving cell supports one transport block or spatial HARQ-ACK bundling is applied and $O_c^{ACK}=2B_c^{DL}$ otherwise, where $B_c^{DL}$ is the number of downlink subframes for which the UE needs to feedback HARQ-ACK bits for the c-th serving cell. In detail, for PCell configured with TDD UL/DL configuration 1, the UE shall assume $B_c^{DL}=\min(W_{DAI}^{UL},M_c)=2$ for PCell and generate two ACK/NACK bits corresponding to DL subframe 5 and 6, a $o_{c,0}^{ACK} o_{c,1}^{ACK}$; for SCell configured with TDD UL/DL configurations 5, the number of possibly to be scheduled DL subframes in SCell later than the subframe of sending DCI format 0/4 whose HARQ-ACKs are reported in the same UL subframe is 2, so the UE shall assume $B_c^{DL}=W_{DAI}^{UL}+4\lceil (U-W_{DAI}^{UL})/4\rceil+2=6$ and generate 6 ACK/NACK bits corresponding to DL subframe 0, 4, 5, 6, 7 and 8, $o_{c,0}^{ACK} o_{c,1}^{ACK} \ldots, o_{c,5}^{ACK}$ where U denotes the maximum total number of received PDSCHs and PDCCH indicating downlink SPS release in subframe(s) n−k on the SCell, k∈K. If UE does not detect any DL PDSCH transmission or PDCCH indicating DL SPS release in the SCell DL subframe 7 or 8, UE shall feedback DTX as HARQ-ACK transmission corresponding to that subframe. There is thus no misunderstanding between eNB and UE on ACK/NACK codebook size determination.

Some embodiments may provide one or more of the following advantages:

(1) Inter-band TDD carrier aggregation with different TDD UL/DL configurations on different bands may be implemented; and (2) Misunderstandings between the eNB and the UE on ACK/NACK codebook size determination may be avoided.

It is noted that whilst embodiments have been described in relation to LTE, similar principles can be applied to any other communication system or to further developments with LTE. Thus, although the embodiments are described with references to uplink and downlink, this disclosure is not limited by these directions between a base station and a user terminal. Instead, the invention is applicable to any system with transmissions between two or more communicating entities. For example, a communication system may be provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or mare of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

What is claimed is:

1. A method comprising:

using, by a user equipment, first information and second information to determine a code book size for an ACK/NACK codebook, the first information comprising information about at least one first subframe of at least one cell for which feedback information is to be transmitted, the at least one first subframe being no later than subframe n and the second information comprising information about at least one second subframe of at least one cell for which feedback information is to be transmitted, the at least one second subframe being after the subframe n; wherein the first information and the second information together comprise information about a plurality of different cells, and wherein the plurality of different cells use different uplink downlink time division duplex configurations; and causing, by the user equipment, the feedback information, based on the code book size, to be transmitted; wherein the ACK/NACK codebook is generated according to a maximum number of actually scheduled type 1 downlink subframes plus a maximum number of type 2 downlink subframes, and wherein the type 1 downlink subframes comprise downlink subframes no later than the subframe n and a corresponding positive or negative acknowledgement transmitted on a physical uplink shared channel scheduled in the subframe n, and wherein the type 2 downlink subframes comprise downlink subframes later than the subframe n and the corresponding positive or negative acknowledgement transmitted on the physical uplink shared channel scheduled in the subframe n.

2. A method as claimed in claim 1, comprising receiving the first information and the second information from a base station.

3. A method as claimed in claim 1, comprising receiving the first information from a base station and calculating the second information.

4. A method as claimed in claim 1, comprising receiving the first information and/or the second information from a base station in a downlink assignment index contained in an uplink grant.

5. A method as claimed in claim 1, comprising causing the feedback information to be transmitted on the physical uplink shared channel scheduled in the subframe n.

6. A method as claimed in claim 1, comprising causing the feedback information to be transmitted in a subframe which is k subframes later than the subframe n.

7. A method as claimed in claim 1, wherein the feedback information comprises feedback information for the at least one first subframe and the at least one second subframe, if the at least one second subframe is scheduled.

8. A method as claimed in claim 1, wherein a discontinuous transmission is provided for the at least one subframe as the feedback information, if the at least one second subframe is not scheduled.

9. A method as claimed in claim 1, wherein the feedback information comprises hybrid automatic repeat request information.

10. A computer program product comprising a non-transitory computer readable medium having executable instructions thereon, which when run by an apparatus are configured to provide the method of claim 1.

11. A method comprising:
causing first information and second information to be provided to a user equipment for determining a code book size for an ACK/NACK codebook, the first information comprising information about at least one first subframe of at least one cell for which feedback information is to be received, the at least one first subframe being no later than subframe n and the second information comprising information about at least one second subframe of at least one cell for which feedback information is to be received, the at least one second subframe being after the subframe n; wherein the first information and the second information together comprise information about a plurality of different cells, and wherein the plurality of different cells use different uplink downlink time division duplex configurations; and
receiving the feedback information, based on the code book size, from the user equipment; wherein the ACK/NACK codebook is generated according to a maximum number of actually scheduled type 1 downlink subframes plus a maximum number of type 2 downlink subframes, and wherein the type 1 downlink subframes comprise downlink subframes no later than the subframe n and a corresponding positive or negative acknowledgement received on a physical uplink shared channel scheduled in the subframe n, and wherein the type 2 downlink subframes comprise downlink subframes later than the subframe n and the corresponding positive or negative acknowledgement received on the physical uplink shared channel scheduled in the subframe n.

12. A computer program product comprising a non-transitory computer readable medium having executable instructions thereon, which when run by an apparatus are configured to provide the method of claim 11.

13. An apparatus comprising at least one processor and at least one memory including computer code for one or more programs, the at least one memory and the computer code configured, with the at least one processor, to cause the apparatus at least to:
use first information and second information to determine a code book size for an ACK/NACK codebook, the first information comprising information about at least one first subframe of at least one cell for which feedback information is to be transmitted, the at least one first subframe being no later than subframe n and the second information comprising information about at least one second subframe of at least one cell for which feedback information is to be transmitted, the at least one second subframe being after the subframe n; wherein the first information and the second information together comprise information about a plurality of different cells, and wherein the plurality of different cells use different uplink downlink time division duplex configurations; and
causing, by the user equipment, the feedback information, based on the code book size, to be transmitted; wherein the ACK/NACK codebook is generated according to a maximum number of actually scheduled type 1 downlink subframes plus a maximum number of type 2 downlink subframes, and wherein the type 1 downlink subframes comprise downlink subframes no later than the subframe n and a corresponding positive or negative acknowledgement transmitted on a physical uplink shared channel scheduled in the subframe n, and wherein the type 2 downlink subframes comprise downlink subframes later than the subframe n and the corresponding positive or negative acknowledgement transmitted on the physical uplink shared channel scheduled in the subframe n.

14. The apparatus as claimed in claim 13, wherein the at least one memory and the computer code are configured with the at least one processor to cause the apparatus to receive the first information and the second information from a base station.

15. The apparatus as claimed in claim 13, wherein the at least one memory and the computer code are configured with the at least one processor to cause the apparatus to receive the first information from a base station and calculate the second information.

16. The apparatus as claimed in claim 13, wherein the at least one memory and the computer code are configured with the at least one processor to cause the apparatus to receive the information from a base station in an uplink downlink assignment index.

17. The apparatus as claimed in claim 13, wherein the at least one memory and the computer code are configured with the at least one processor to cause the apparatus to cause the feedback information to be transmitted on a physical uplink shared channel scheduled in sub frame n.

18. The apparatus as claimed in claim 13, wherein the at least one memory and the computer code are configured with the at least one processor to cause the apparatus to cause feedback information to be transmitted in a subframe which is k subframes later than sub frame n.

19. The apparatus as claimed in claim 13, wherein the feedback information comprises feedback information for the at least one first subframe and the at least one second subframe, if at least one second subframe is scheduled.

20. The apparatus as claimed in claim 13, wherein the at least one memory and the computer code are configured with the at least one processor to cause the apparatus to provide a discontinuous transmission for the at least one subframe as the feedback information, if the at least one second subframe is not scheduled.

21. The apparatus as claimed in claim 13, wherein the feedback information comprises hybrid automatic repeat request information.

22. A user equipment comprising the apparatus as claimed in claim 13.

23. An apparatus, comprising at least one processor and at least one memory including computer code for one or more programs, the at least one memory and the computer code configured, with the at least one processor, to cause the apparatus at least to:
cause first information and second information to be provided to a user equipment for determining a code book size for an ACK/NACK codebook, the first information comprising information about at least one first subframe of at least one cell for which feedback information is to be received, the at least one first subframe being no later than subframe n and the second information comprising information about at least one second subframe of at least one cell for which feedback information is to be received, the at least one second subframe being after the subframe n; wherein the first information and the second information together comprise information about a plurality of different cells, and wherein the plurality of different cells use different uplink downlink time division duplex configurations; and
receive the feedback information, based on the code book size, from the user equipment; wherein the ACK/NACK codebook is generated according to a maximum number of actually scheduled type 1 downlink subframes plus a maximum number of type 2 downlink subframes, and wherein the type 1 downlink subframes comprise downlink subframes no later than the subframe n and a corresponding positive or negative acknowledgement received on a physical uplink shared channel scheduled in the subframe n, and wherein the type 2 downlink subframes comprise downlink subframes later than the subframe n and the corresponding positive or negative acknowledgement received on the physical uplink shared channel scheduled in the subframe n.

24. A base station comprising the apparatus as claimed in claim 23.

25. A method comprising:
causing first information to be provided to a user equipment for determining, along with second information, a code book size for an ACK/NACK codebook, the first information comprising information about at least one first subframe of at least one cell for which feedback information is to be received, the at least one first subframe being no later than subframe n and the second information comprising information about at least one second subframe of at least one cell for which feedback information is to be received, the at least one second subframe being after the subframe n; wherein the first information and the second information together comprise information about a plurality of different cells, and wherein the plurality of different cells use different uplink downlink time division duplex configurations; and
receiving the feedback information, based on the code book size, from the user equipment; wherein the ACK/NACK codebook is generated according to a maximum number of actually scheduled type 1 downlink subframes plus a maximum number of type 2 downlink subframes, and wherein the type 1 downlink subframes comprise downlink subframes no later than the subframe n and a corresponding positive or negative acknowledgement received on a physical uplink shared channel scheduled in the subframe n, and wherein the type 2 downlink subframes comprise downlink subframes later than the subframe n and the corresponding positive or negative acknowledgement received on the physical uplink shared channel scheduled in the subframe n.

26. A computer program product comprising a non-transitory computer readable medium having executable instructions thereon, which when run by an apparatus are configured to provide the method of claim 25.

27. An apparatus comprising at least one processor and at least one memory including computer code for one or more programs, the at least one memory and the computer code configured, with the at least one processor, to cause the apparatus at least to:
cause first information to be provided to a user equipment for determining, along with second information, a code book size for an ACK/NACK codebook, the first information comprising information about at least one first subframe of at least one cell for which feedback information is to be received, the at least one first subframe being no later than subframe n and the second information comprising information about at least one second subframe of at least one cell for which feedback information is to be received, the at least one second subframe being after the subframe n; wherein the first information and the second information together comprise information about a plurality of different cells, and wherein the plurality of different cells use different uplink downlink time division duplex configurations; and
receive the feedback information, based on the code book size, from the user equipment; wherein the ACK/NACK codebook is generated according to a maximum number of actually scheduled type 1 downlink subframes plus a maximum number of type 2 downlink subframes, and wherein the type 1 downlink subframes comprise downlink subframes no later than the subframe n and a corresponding positive or negative acknowledgement received on a physical uplink shared channel scheduled in the sub frame n, and wherein the type 2 downlink subframes comprise downlink subframes later than the subframe n and the corresponding positive or negative acknowledgement received on the physical uplink shared channel scheduled in the subframe n.

* * * * *